May 21, 1940.　　　D. M. LIGHT　　　2,201,441
BRAKE GEAR SAFETY GUARD
Filed July 2, 1938　　　5 Sheets-Sheet 1
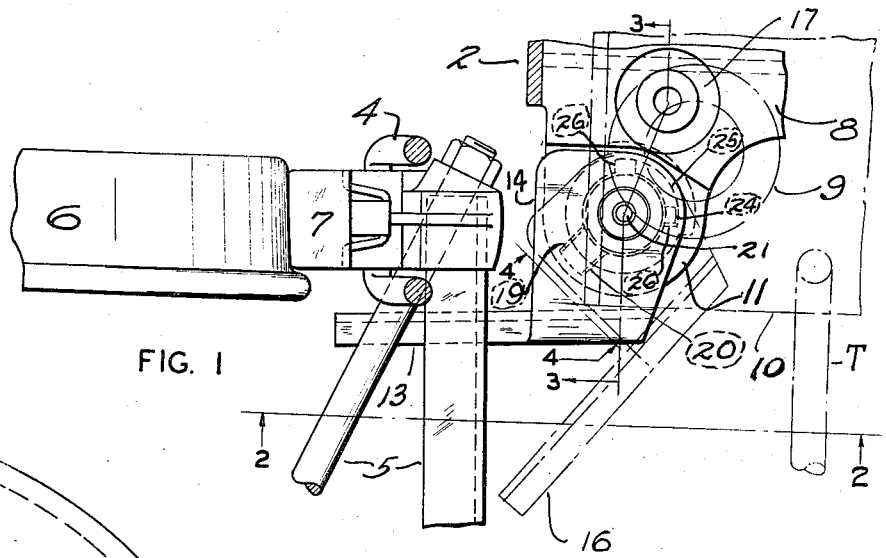
INVENTOR
DAVID M. LIGHT
BY Rodney Bedell
ATTORNEY May 21, 1940.　　　　D. M. LIGHT　　　　2,201,441
BRAKE GEAR SAFETY GUARD
Filed July 2, 1938　　　5 Sheets-Sheet 2
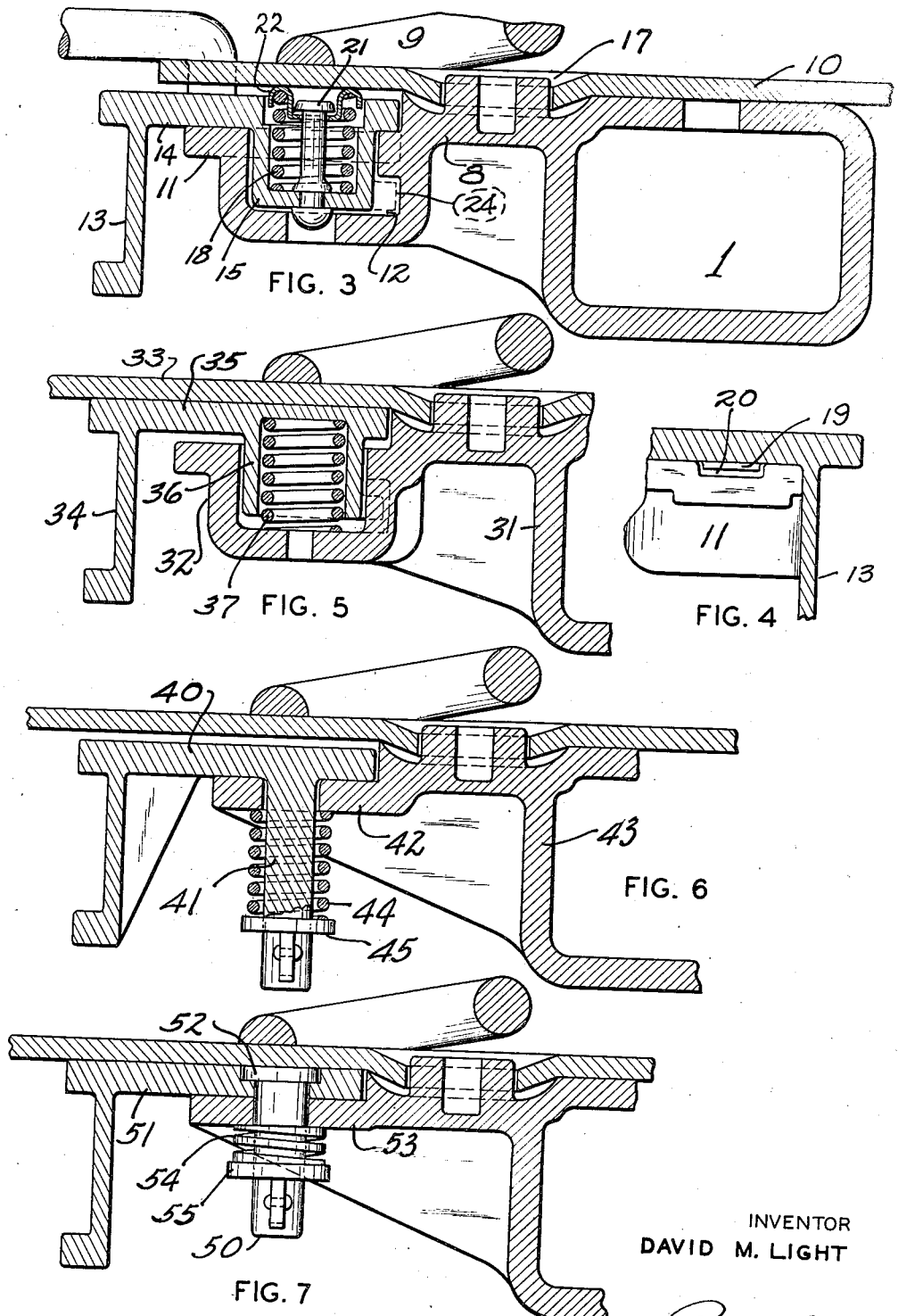

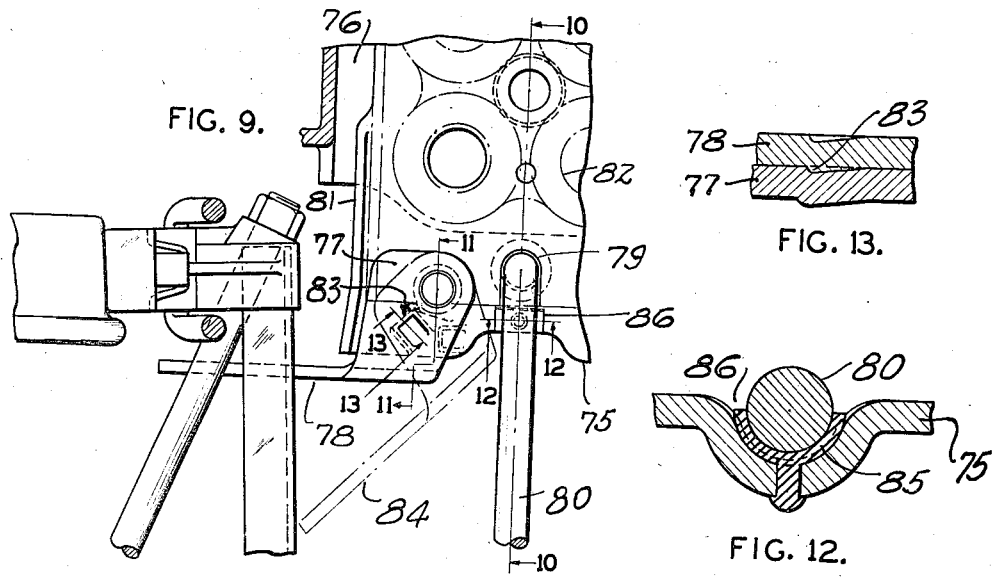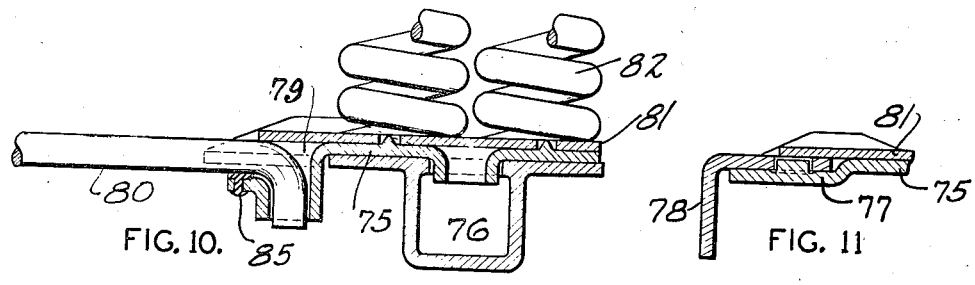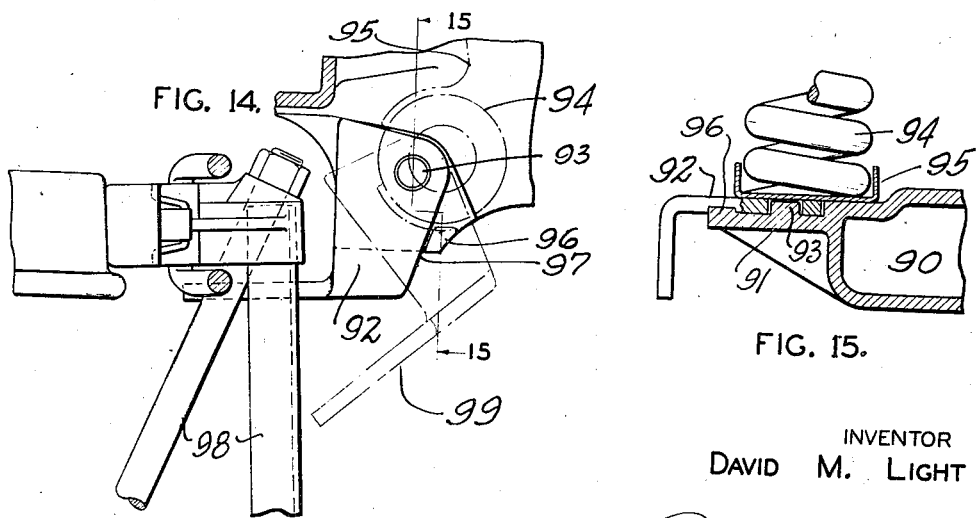

May 21, 1940.  D. M. LIGHT  2,201,441
BRAKE GEAR SAFETY GUARD
Filed July 2, 1938  5 Sheets-Sheet 4
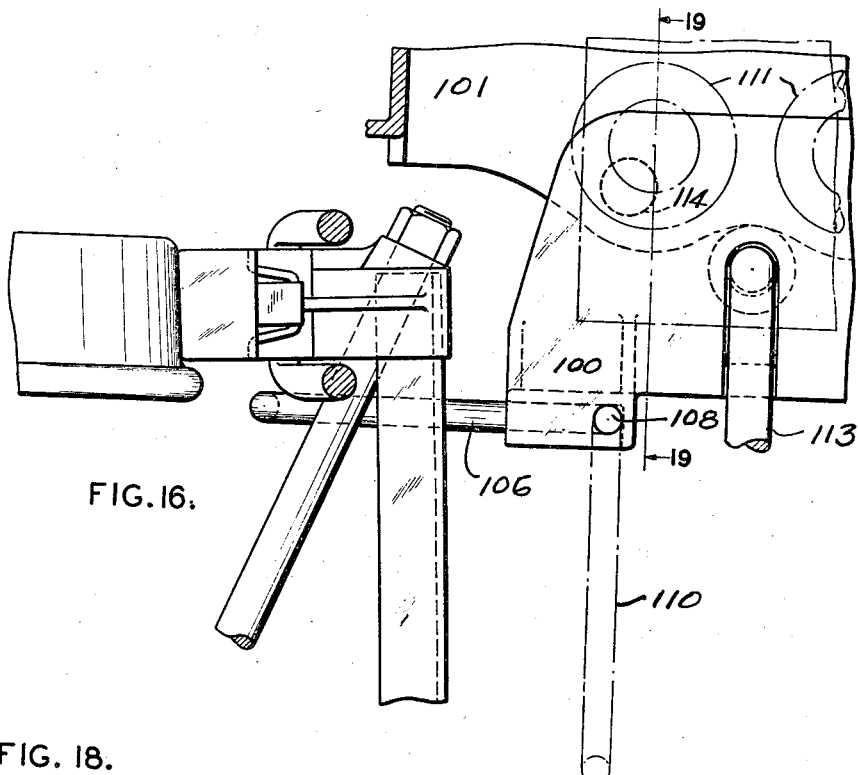
FIG. 16.
FIG. 18.
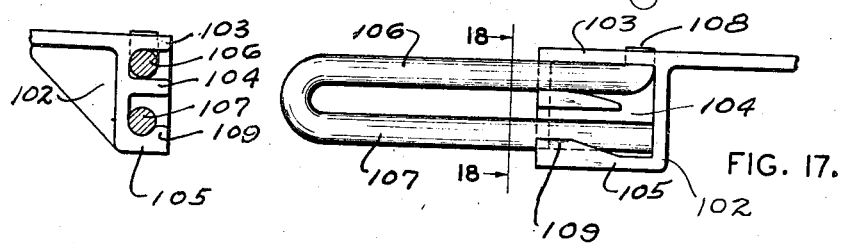
FIG. 17.
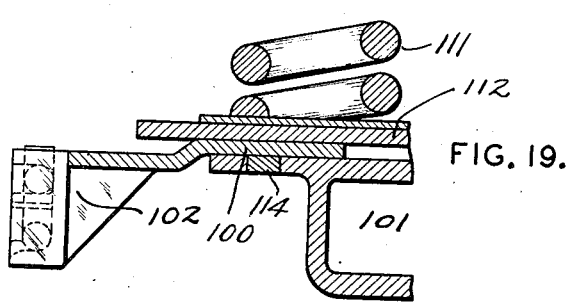
FIG. 19.
INVENTOR
DAVID M. LIGHT
BY Rodney Bedell
ATTORNEY May 21, 1940. D. M. LIGHT 2,201,441
BRAKE GEAR SAFETY GUARD
Filed July 2, 1938 5 Sheets-Sheet 5

INVENTOR
DAVID M. LIGHT
BY *Rodney Bedell*
ATTORNEY

Patented May 21, 1940

2,201,441

UNITED STATES PATENT OFFICE 2,201,441

BRAKE GEAR SAFETY GUARD

David M. Light, Chicago, Ill., assignor to American Steel Foundries, Chicago, Ill., a corporation of New Jersey Application July 2, 1938, Serial No. 217,165

28 Claims. (Cl. 188—210)

The invention relates to railway trucks and more particularly to structure for safeguarding, guiding, or otherwise supporting railway brake gear to prevent the same from dropping to the road bed. Usually, but not essentially, the invention will be supplementary to hangers or other support structure such as are in general use.

The main objects of the invention are to securely mount a brake gear support device upon the side frame of the truck; to utilize the load on the truck springs to maintain the assembly of the support device with the side frame; to utilize the tension of the truck spring to prevent chatter and play between the support device and its mounting; to facilitate the ready movement of the support device out of the path of the brake gear so that the latter may be removed and replaced when desired; and to accommodate removal and replacement of the support device without requiring the removal of cotters, pins, or other fastening means, and without requiring riveting or other machine-like operations.

Other detailed objects of the invention will be apparent from the following description of the invention, reference being had to the accompanying drawings in which—

Figure 1 is a top view of a portion of a truck wheel and the adjacent end of the brake beam, a safety support device therefor, and the adjacent portion of the truck frame, a spring plate and a tie rod being indicated in broken lines.

Figure 2 is a side elevation and section of the same parts taken substantially on the line 2—2 of Figure 1.

Figure 3 is a vertical section taken on the line 3—3 of Figure 1.

Figure 4 is a detail vertical section taken on the line 4—4 of Figure 1.

Figures 5, 6, 7 and 8 correspond to Figure 3 but illustrate different forms of the invention.

Figure 9 is a top view of a modified structure.

Figure 10 is a vertical section on the line 10—10 of Figure 9.

Figures 11, 12 and 13 are detailed sections on the lines 11—11, 12—12, and 13—3 of Figure 9.

Figure 14 is a fragmentary top view of another form of the invention.

Figure 15 is a vertical transverse section taken approximately on the line 15—15 of Figure 14.

Figure 16 corresponds to Figure 9 but illustrates another modification of the invention.

Figure 17 is a side elevation of the structure shown in Figure 16.

Figure 18 is a vertical section taken on the line 18—18 of Figure 17.

Figure 19 is a detail section taken on the line 19—19 of Figure 16.

Figure 20:
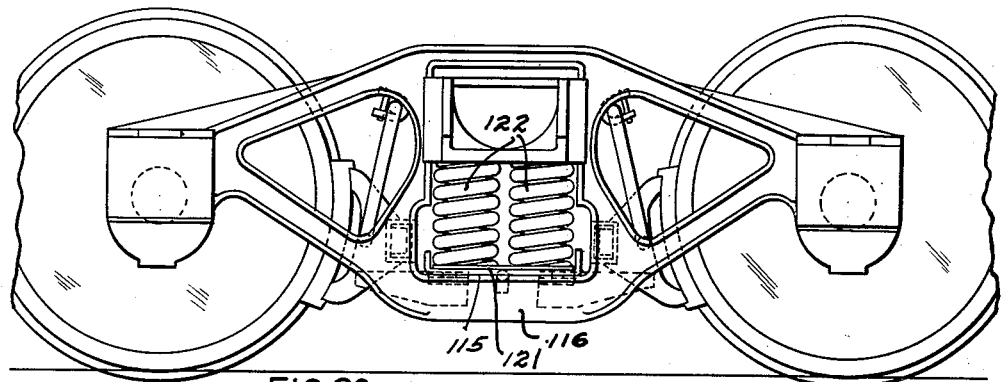

Figure 20 is a side elevation of a complete four-wheel truck embodying the form of the invention detailed in Figures 9–13.

Figure 21:
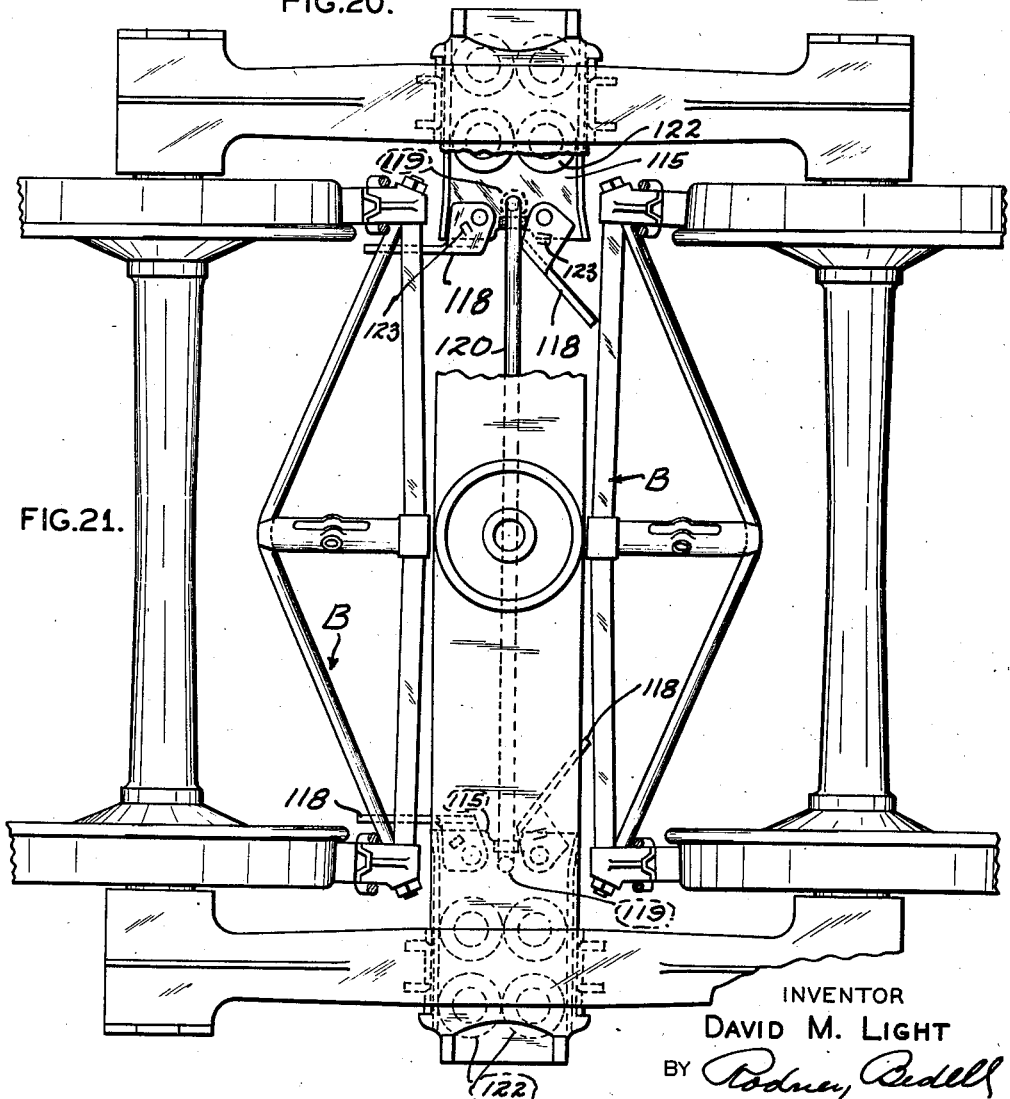

Figure 21 is a top view of the same truck with the portion of the bolster broken away to more clearly illustrate the guard structure.

The invention is illustrated as applied to a common form of car truck, the truss type side frame of which includes a tension member, the lower middle portion of which is shown at 1, and spaced struts or bolster guides 2 provided with brackets 3 from which are suspended the hangers 4 which carry the brake beams 5 in the usual manner. One of the truck wheels is indicated at 6, and the beam is shown in position with its shoe 7 in contact with the wheel tread.

Side frame member 1 includes a spring seat portion 8 which mounts the bolster springs 9 either directly or through a spring carrying plate 10 forming a bracket upper part. If the device is applied to a spring plankless truck, plate 10 will terminate a short distance inwardly of the side frame and a tie bar T may extend between the plates at opposite sides of the truck. In trucks with a spring plank, member 10 may comprise the end portion of the spring plank extending between the side frames at opposite sides of the truck.

Shelf 8 on the side frame includes a bracket lower part 11 projecting inwardly from the frame and having a cup-like recess 12. The top of bracket part 11 and the bottom of spring plate 10 are spaced from each other vertically and, preferably, bracket 8 and plate 10 include interengaging structure as indicated at 17 to hold the plate in position.

The brake gear support device comprises a bar 13 positioned beneath the end portion of the brake beam and having an arm 14 extending into the space between bracket part 11 and spring plate 10 and including a depending hollow boss 15 fitting into the cup 12 in bracket part 11 to form a pivotal connection between the gear support and the side frame whereby bar 13 may be swung from the full line position indicated in Figure 1 to the broken line position indicated at 16. In the latter position the brake beam may be dropped and removed without interference by the safety support device and, when the repaired or new beam is replaced, bar 13 may be swung back to the functioning position.

While the enumerated parts comprise the more essential features of the invention, additional elements are preferred to make the device more workmanlike and to secure other advantages. A spring 18 in boss 15 is compressed between the bottom of the boss and the bottom of plate 10 and holds arm 14 against bracket part 11 and provides a uniform frictional resistance to the rotation of arm 14 about its pivot. Positive resistance to such movement may be provided by a lug 19 (Figure 4) and a corresponding recess 20 in the rim of bracket part 11. If this feature is included, it is necessary to raise the support device against the thrust of spring 18 to disengage elements 19 and 20.

Preferably a stud bolt or rivet 21 and washer 22 hold spring 18 in assembled relation with boss 15 so the device may be removed as a unit without losing the spring element. A lug 24 projecting from boss 15 moves within a segmental groove 25 in bracket 11 and abuts the ends 26 of this groove to limit the pivotal movement of the support device.

In the form of the invention illustrated in Figure 5, the side frame parts 31 and 32 and the spring plank 33 and beam supporting bar 34 and arm 35 correspond, respectively, to the elements 1, 11, 10, 13 and 14 previously described, but the boss 36 on arm 35 opens downwardly to receive a spring 37 which supports the device from the bottom of the bracket cup, the frictional resistance to pivotal movement of the support device being furnished by contact between bar 35 and spring plate 33.

In Figure 6 the support device arm 40 has an integral depending pivot pin element 41 projecting through an aperture in bracket part 42 on frame 43. A spring 44 compressed between the downwardly facing surface of bracket part 42 and a washer 45 removably secured to pin 41 provides the yielding means for maintaining the gear support device in desired position.

Figure 7 illustrates a similar arrangement but in which the pivot pin 50 is formed separately from the support arm 51 and its head 52 holds the support arm against bracket part 53 due to the downward thrust of spring 54 against the washer 55 detachably secured to pin 50.

Figure 8 illustrates a form of the invention in which the spaced vertical elements 60 and 61 projecting from side frame member 62 are integral with the latter and the cooperating arm 63 on the support device is inserted laterally between elements 60 and 61 until the shoulder elements 64 and 65 may drop into corresponding recesses in frame element 61. The hollow cup 66 on arm 63 receives a bushing 67, a spring 68 and a bolt 69. Spring 68 normally thrusts bushing 67 upwardly until its collar 70 engages the head of the bolt, in which position the bushing extends upwardly from cup 66 into the recess in frame element 60 and prevents withdrawal of support device arm 63. Also the spring tends to hold the device arm against frame element 61.

The bolt device in this form, as in Figures 6 and 7, prevents the removal of the safety device irrespective of any weight which may be applied to the device tending to bend the spring plate upwardly. Hence the arm cannot be lost out of the side frame because of a broken bolster spring normally resting upon the portion of the spring plate immediately over the pivot structure.

Figures 9 to 13 illustrate another form of the invention in which a plate 75 is seated on a lower portion 76 of the truck frame and projects inwardly therefrom and is depressed to provide a seat 77 for the brake gear support 78 and is apertured at 79 to receive the hooked end of a tie rod 80.

The gear support and the tie rod are held against disengagement from plate 75 by the plate 81 which forms a seat for the bolster springs 82.

The inner portions of support 78 and the seat 77 therefor are provided with cooperating offsets, indicated at 83 in Figure 13, which yieldingly hold the support in functioning position, as indicated by full lines in Figure 9. By use of a suitable lever, the support may be rotated to the broken line position, indicated at 84, permitting the dropping of the brake beams.

Preferably a rubber insert 85 is secured in the depression 86 for tie rod 80 and cushions the latter to avoid rattling and wear of the adjacent parts.

In Figures 14 and 15 the lower member 90 of the side frame includes an integral bracket 91 on which is mounted the inner end 92 of the gear support arm, the latter having an aperture for receiving a pivot lug 93 on the bracket. The support arm 92 is retained in assembly with the frame by the bolster springs 94 mounted on the spring plate 95 resting mainly on the side frame member 90 but having a portion of their weight carried by the inner end of the gear support arm 92. A holding lug 96 on bracket 91 is disposed to engage the rear edge 97 of support arm 92, when the latter is in the full lined functioning position beneath the brake beam 98, but when it is desired to move the arm out of functioning position, a crowbar or similar lever may be used to raise arm 92 over lug 96 to permit the arm to be moved to the broken line position indicated at 99.

Figures 16, 17, 18 and 19 illustrate a form of the invention in which the bracket 100 is carried on the truck side frame 101 and includes an inwardly and downwardly extending projection 102 having vertically spaced ribs 103, 104, and 105. The support arm comprises a looped rod member formed of materials of sufficient elasticity to thrust its legs 106 and 107 away from each other. These legs may be pressed together so that upper leg 106 may be inserted in the recess between ribs 103 and 104 and the lower leg 107 may be inserted in the recess between ribs 104 and 105. The upturned lug 108 on leg 106 projects into an opening provided in rib 103, and a lug 109 on rib 105 forms a shoulder opposing leg 107. These elements serve to retain arm 106—107 in operative position in the supporting bracket, but upon lifting leg 107 over lug 109 the arm may be swung to the inoperative position shown in broken lines at 110.

The truck springs 111, with their seat member 112, rest upon bracket 100 and cooperate with lug 114 received in the spring seat to hold the bracket in assembled relation with the truck frame. The structure may include a tie rod 113 anchored to brackets 100 at opposite sides of the truck similarly to the arrangement shown in Figures 9 to 11. This construction utilizes the feature of spring retention of the support arm in its bracket in addition to and, to a certain extent, irrespective of the maintenance of the assembly by the truck springs, but in other respects corresponds in principle to the structures previously described, as in Figures 1 to 7, inclusive, retention of the support arm in its mounting being maintained by spring means which will be constant irrespective of the load on the truck bolster.

In all forms of the invention the safety device is mounted on a bracket projecting from the side frame, either in the form of an integral extension of the side frame or a part resting thereon.

Obviously bracket 75 (Figure 10) and bracket 100 (Figure 19) may be formed as an integral part of the truck side frame as are the corresponding brackets in Figures 1 to 7. Conversely the latter-mentioned brackets may be formed separately from the side frame and assembled therewith as shown, or by welding, riveting, etc.

It will be understood that the brake beam, support and mounting for the support shown in each form of the invention are duplicated at the other side of the truck and usually at each side of the transverse center line of the truck and brackets, notwithstanding the fact that the more essential features of the invention may be embodied in a single supporting unit and its mounting.

Figures 20 and 21 illustrate such a duplicate arrangement of the structure detailed in Figures 9–13. The lower member 116 of each side frame carries a plate 115 projecting inwardly from the side frame and seating the brake gear supports 118 and apertured at 119 to receive the hooked end of the tie rod 120 which extends across the truck, with its other end anchored in the corresponding plate 115 mounted on the other side frame. A plate 121 overlies the horizontal portions of supports 118 and the bolster springs 122 are seated on plate 121. Each of the supports and the corresponding portion of its seat has the cooperating offsets 123 for yieldingly retaining the support in the position illustrated, although they may be rotated as indicated by the supports at the right hand end of the truck to drop the corresponding brake beam B.

In all forms of the invention the gear support device is movable on the mounting bracket into and out of functioning position without jacking up the car or the truck bolster, or removing or compressing the bolster springs, or removing securing bolts, rivets, pins, etc. Nevertheless, the truck springs serve to maintain the assembly of the gear support device with its mounting bracket and the side frame. The individual smaller spring structures present in some of the devices yieldingly maintain a predetermined tension between the parts, irrespective of variations in the load on the truck, and serve to take up any wear which might develop between the parts of the support device.

As previously indicated, the device is applicable to spring plankless trucks as well as to trucks having spring planks. Obviously all of the features illustrated need not be included in the device to utilize the spirit of the invention.

The arrangements illustrated and described are to be considered illustrative only as other variations may be made without departing from the spirit of the invention and the exclusive use of such modifications as come within the scope of the claims is contemplated.

What is claimed is:

1. In a railway truck, a side frame, a bolster spring carried thereby, and a brake gear support device pivotally mounted on said frame to swing into and out of functioning position and retained in assembled relation with said frame by said spring.

2. In a railway truck, a side frame having a bolster spring seat member, a spring supporting plate member mounted thereon, portions of said members being spaced apart vertically, and a brake gear support device including an arm extending between the spaced apart portions of said members and pivotally connected to one of them and rotatable relative thereto into and out of functioning position.

3. A structure as described in claim 2 which also includes elements yieldingly holding the brake gear support device against movement from its normal functioning position.

4. A structure as described in claim 2 which also includes yielding structure compressed between the brake gear support device and one of the members to minimize play between the parts.

5. In a railway truck, a side frame having a shelf member for supporting a bolster spring, there being a cup-like depression in said member, a brake gear support device including an arm overlying a part of said member and having a depending boss fitting in said depression to form a pivotal connection with said frame, and a spring plate member on said shelf member overlying said arm and retaining the same in assembled relation with said frame.

6. In a railway truck, a side frame having a shelf member for supporting a bolster spring, there being a cup-like depression in said member, a brake gear support device including an arm overlying a part of said member and having a depending hollow boss fitting in said depression, a spring plate member on said shelf member overlying said arm, and a spring in said boss and compressed between the bottom of the same and said plate member.

7. In a railway truck, a side frame having a shelf member for supporting a bolster spring, there being a cup-like depression in said member, a brake gear support device including an arm overlying a part of said member and having a hollow boss fitting in said depression for pivotal assembly of said device and frame, a spring plate member on said shelf member overlying said arm, and a spring in said boss and compressed between the bottom of the same and one of said members.

8. In a railway truck, a side frame, a brake gear guard, guide or support member pivotally carried on said side frame and movable about its pivot into and out of functioning position, structure for retaining said member in place including a bolster carrying spring, and means other than said bolster spring determining the resistance to pivotal movement of said member.

9. In a railway truck, a side frame having a bolster spring seat member, a spring supporting plate member mounted thereon, portions of said members being spaced apart vertically, and a brake gear support device including an arm extending between the spaced apart portions of said members, and a part projecting from said arm into an aperture in said seat member and pivotally connecting said seat member and arm whereby the latter may be swung into and out of functioning position.

10. In a railway truck, a side frame having a bolster spring seat member, a spring supporting plate member mounted thereon, portions of said members being spaced apart vertically, and a brake gear support device including an arm extending between the spaced apart portions of said members and including a downwardly projecting pivot element insertible into an aperture in said seat member when said plate member is removed, said element being held against removal from said seat member by said plate member when the latter is in spring supporting position.

11. A structure as described in claim 10 which also includes means in addition to the plate member for holding the gear support device in assembled relation with the side frame.

12. In a railway truck, a side frame having a bolster spring seat member, a spring supporting plate member mounted thereon, portions of said members being spaced apart vertically, and a brake gear support device including an arm extending between the spaced apart portions of said members and including an integral element projecting through said spring seat member to pivotally connect said arm and spring seat member whereby said arm may be swung into and out of functioning position.

13. A structure as described in claim 2 which also includes spring structure compressed between the brake gear support device and one of the members to minimize play between the parts, interengaging elements on said latter-mentioned member and said device for positively preventing pivotal movement of said device, said elements being disengageable by yielding of said spring structure.

14. In a railway truck, a side frame, a brake gear support device pivoted on said frame to be moved into and out of functioning position, and means yieldingly holding said device in functioning position.

15. In a railway truck, a side frame having a bolster spring carrying bracket part, a brake gear support device pivoted to said bracket part to move into and out of functioning position, and means yieldingly engaging said device and said bracket part to hold said device in functioning position.

16. In a railway truck, a side frame, a bracket thereon, a brake gear support device pivotally mounted on said bracket to swing horizontally into and out of functioning position beneath the brake beam, and a spring engaging said device and a part of said frame to yieldingly hold said device in position.

17. In a railway truck, a side frame, a brake gear support device pivotally mounted on said frame to swing to and away from functioning position, and a truck bolster spring resisting upward movement of said device and retaining it in assembled relation with said frame.

18. In a railway truck, a side frame, a bracket projecting therefrom inwardly of the truck, a spring plate resting on said bracket and projecting inwardly of the truck beyond the bolster springs, and a brake gear support arm extending between and positioned by said plate and bracket and pivoting thereon into and out of functioning position.

19. In a railway truck, a side frame, a bracket projecting therefrom inwardly of the truck, a brake gear support member pivotally mounted on said bracket, a tie member connected to said bracket and extending therefrom transversely of the truck, a bolster spring plate carried on said bracket and overlying said members and retaining the same in assembled relation with said bracket.

20. A truck structure as described in claim 19 which also includes yielding support for said members whereby play between said members and their carrying and retaining parts is eliminated.

21. In a railway truck, a side frame, a bracket projecting therefrom inwardly of the truck and having a plurality of depressed portions, a brake gear support arm pivotally mounted on one of said depressed portions, a tie bar seated in another of said depressed portions and extending from said bracket transversely of the truck, a bolster spring plate carried on said bracket and overlying said arm and said tie bar and retaining the same in assembled relation with said bracket, said depressions varying in depth to support said arm and tie bar so that the top surfaces of the support arm and tie bar are substantially flush and engaged by said spring plate.

22. In a railway truck, spaced side frames, brackets for brake gear support devices extending inwardly from said side frames, a tie bar extending between said brackets on opposite sides of the truck, said brackets being provided with cushioned seats for said tie bar.

23. In a railway truck, side frames, brackets projecting from said side frames for mounting the brake gear support devices, a tie bar extending between said brackets, and rubber cushions for supporting said tie bar on said brackets.

24. A truck as described in claim 23 in which the tie bar is held against its seats by the truck bolster springs.

25. In a railway truck, a side frame, a bolster spring carried thereby, bracket structure projecting from said frame inwardly of the truck and including a part retained in place by said bolster spring, and a brake gear support arm pivotally mounted on the inwardly projecting portion of said bracket structure, said arm being held in position on said bracket by yielding structure other than said bolster spring.

26. In a railway truck, a side frame, bracket structure extending inwardly from said frame and including vertically spaced members, a brake gear support device comprising elements yieldingly thrust in opposite directions into engagement with said members and pivotally movable on said bracket structure out of functioning position when said yielding structure is distorted.

27. In a railway truck, a side frame, and a brake gear support device comprising an arm pivoted to said frame whereby said support may be moved in a horizontal arc to and from functioning position, the device including spring structure yieldingly holding said arm against such pivotal movement.

28. In a railway truck, a side frame, a bracket projecting therefrom inwardly of the truck, a spring plate resting on said bracket and projecting inwardly of the truck beyond the bolster springs, and a brake gear support device comprising a part between and positioned by said plate and bracket and a swinging part movable into and out of functioning position.

DAVID M. LIGHT.